United States Patent
Deshmukh et al.

(10) Patent No.: US 12,346,240 B2
(45) Date of Patent: Jul. 1, 2025

(54) SYSTEMS AND METHODS FOR VALIDATING A CLOUD-HOSTED APPLICATION

(71) Applicant: Barclays Execution Services Limited, London (GB)

(72) Inventors: Anshuman Deshmukh, Pune (IN); Nikita Ghorpade, Nashik (IN); Meghana Kochrekar, Pune (IN)

(73) Assignee: Barclays Execution Services Limited, London (GB)

( * ) Notice: Subject to any disclaimer, the term of this patent is extended or adjusted under 35 U.S.C. 154(b) by 221 days.

(21) Appl. No.: 18/077,952

(22) Filed: Dec. 8, 2022

(65) Prior Publication Data

US 2023/0185705 A1  Jun. 15, 2023

(30) Foreign Application Priority Data

Dec. 9, 2021  (EP) .................................... 21213554

(51) Int. Cl.
- *G06F 11/3668* (2025.01)
- *G06F 9/54* (2006.01)
- *G06F 11/3698* (2025.01)

(52) U.S. Cl.
CPC ............ *G06F 11/3688* (2013.01); *G06F 9/54* (2013.01); *G06F 11/3692* (2013.01); *G06F 11/3698* (2025.01)

(58) Field of Classification Search
None
See application file for complete search history.

(56) References Cited

U.S. PATENT DOCUMENTS 10,901,880 B1 *  1/2021  Bernard .............. G06F 11/3476
11,102,081 B1 *  8/2021  Tiwari .................... H04L 67/51

OTHER PUBLICATIONS

The Extended European Search Report mailed May 23, 2022, in the European patent application No. 21213554.5. 9 pages.

* cited by examiner

*Primary Examiner* — Lewis A Bullock, Jr.
*Assistant Examiner* — Mark A Gooray
(74) *Attorney, Agent, or Firm* — Wilmer Cutler Pickering Hale and Dorr LLP

(57) ABSTRACT

A computer-implemented method for automatically testing a cloud-hosted application is disclosed. A test object is defined for at least one service of the cloud-hosted application. The test object comprises an API request configured to be transmitted to the at least one service of the cloud-hosted application via an API interface or a service call configured to invoke the at least one service directly. The test object is transmitted to the at least one service of the cloud-hosted application. The test object is processed at the at least one service of the cloud-hosted application to generate an API formatted response and associated service log data. The cloud-hosted application is validated based on the API formatted response and the associated service log data.

18 Claims, 7 Drawing Sheets

SYSTEMS AND METHODS FOR VALIDATING A CLOUD-HOSTED APPLICATION

CROSS-REFERENCE TO RELATED APPLICATIONS

This application claims priority to EP patent application Ser. No. 21/213,554.5, filed on Dec. 9, 2021, the disclosure of which is hereby incorporated herein by reference in its entirety.

FIELD OF THE INVENTION

The present invention relates to systems and methods for performing end-to-end testing and validation of the operation of cloud-hosted applications provisioned in a cloud-computing environment.

BACKGROUND

For a number of years, organisations and individuals have been migrating from hosting applications on-premise (i.e. locally) to hosting applications on third-party cloud services. While hosting applications on third-party cloud services provides benefits such as ease of access to high-power computing and mass storage, certain challenges arise in respect of performing end-to-end testing and validation of the operation of said applications.

Third-party cloud service providers, such as Amazon Web Services, provide various services that may be accessed and employed by applications developed by subscribing organisations and individuals, typically via an API (application programming interface). Accordingly, various functions of an organisation's or individual's applications are performed by services provided by a third party (i.e. the cloud service provider). As such, the testing and validation of cloud-hosted applications requires invoking and monitoring, either via an API, or directly, the relevant services provided by the third-party cloud service provider that are accessed and employed by the cloud-hosted application as it processes and manages data.

Presently, there exists no toolset or product that allows for the end-to-end testing of cloud-hosted applications with reduced user input. Accordingly, the testing and validation of cloud-hosted applications is performed manually, i.e. by logging onto the third-party cloud service provider user interface and directly and manually invoking individual services that are accessed and employed by the cloud-hosted application, before manually monitoring the associated service log data to manually validate the application. An alternative method for testing and validating cloud-hosted applications involves semi-automating the process by employing API request tools that can trigger the individual services provided by the third-party cloud service provider that are accessed and employed by the cloud-hosted application. However, validation may still only be performed by monitoring the associated service log data on a manual basis. Both of these approaches are inefficient and require significant user intervention while testing a single cloud-hosted application, and this can be problematic in a cloud-hosted environment.

SUMMARY OF THE INVENTION

In one aspect of the invention, there is provided a computer-implemented method for end-to-end testing of a cloud-hosted application, comprising:

a) defining a test object for at least one service of the cloud-hosted application, the test object comprising an API request configured to be transmitted to the at least one service of the cloud-hosted application via an API interface or a service call configured to invoke the at least one service directly;

b) transmitting the test object to the at least one service of the cloud-hosted application;

c) processing the test object at the at least one service of the cloud-hosted application to generate an API formatted response and associated service log data; and d) validating the cloud-hosted application based on the API formatted response and the associated service log data.

In a further aspect of the invention, there is provided an end-to-end cloud-hosted application test system, comprising:

a) a test agent;
b) an API interface; and
c) a cloud-hosted application, comprising at least one service, wherein, the test agent is configured to:

define a test object for at least one service of the cloud-hosted application, the test object comprising an API request configured to be transmitted to the at least one service of the cloud-hosted application via an API interface or a service call configured to invoke the at least one service directly;

transmit the test object to the at least one service of the cloud-hosted application;

receive an API formatted response and associated service log data in response to the at least one service of the cloud-hosted application processing the test object;

validate the cloud-hosted application based on the API formatted response and the associated service log data.

The method and system provide an end-to-end testing framework that reduces user intervention and further provides a more efficient and accurate process of testing and validation of the operation of cloud-hosted applications.

In a further embodiment, validating the cloud-hosted application based on the API formatted response and the associated service log data comprises comparing the API formatted response and the associated service log data.

In a further embodiment, validating the cloud-hosted application based on the API formatted response and the associated service log data comprises comparing the data of the fields of the API formatted response with the data of the fields of service log data.

By validating the cloud-hosted application by comparing the API formatted response and the associated service log data, the accuracy of the validation is improved relative to known solutions since validation is performed on the basis of two sets of data, i.e. both the API formatted response and the associated service log data that may be received in response to the cloud-hosted application processing the test object. This mechanism for validation not only provides an extra layer to validating cloud-hosted applications relative to known solutions, but also helps to identify instances in which a seemingly-correct output provided by the API formatted response is in fact the product of incorrect processing of the test object at the at least one service of the cloud-hosted application, i.e. where the output provided by the API formatted response incidentally appears correct but is in fact the product of incorrect processing. The nature of the processing of the test object may be determined by analysing and/or performing tests on the associated service log data.

In a further embodiment, validating the cloud-hosted application based on the API formatted response and the associated service log data comprises checking whether the API formatted response and the associated service log data are consistent with expected results for the given test object.

In addition to comparing the API formatted response and the associated service log data, the API formatted response and the associated service log may be checked against expected results for a given test object. By validating the operation of the cloud-hosted application on the basis of both the API formatted response and the associated service log data being consistent with expected results, the accuracy of validation is improved relative to known solutions that simply rely on checking one of the API formatted response or the associated service log data against an expected result.

In a further embodiment, the method further comprises validating the cloud-hosted application based on comparing the API request with the associated service log data.

In a further embodiment, associated service log data characterises the processing at and the output of the at least one service when processing the test object at the at least one service.

Where the test object may be defined as an API request, validation may be performed on the basis of analysing and performing tests on the subsequently produced associated service log data to check whether the various fields of the associated service log data are in line with that which is expected in response to a given API request. A given API request may emulate data that may be transmitted from an end user device communicating with the cloud-hosted application during normal use. Accordingly, comparing the API request with the associated service log data allows for checking whether the API request received at the cloud-hosted application is processed correctly by the cloud-hosted application. This allows for validating a cloud-hosted application on the basis of the processing that takes place to arrive at the output, and not only on the output value itself.

In a further embodiment, the API formatted response comprises API end response data.

In a further embodiment, the API formatted response comprises schema data.

An API formatted response may consist of more than just a single value relating to an output or outcome of the processing of the test object at the cloud-hosted application. By validating the cloud-hosted application based on the API formatted response and the associated service log data, where the API formatted response includes not only end response data but also schema data, allows for providing a multi-faceted validation process. Consequently, this helps to improve the accuracy of validating the cloud-hosted application.

In a further embodiment, transmitting the test object to the at least one service of the cloud-hosted application comprises transmitting the test object to a first of the at least one service.

In a further embodiment, processing the test object at the at least one service of the cloud-hosted application to generate an API formatted response and associated service log data comprises chaining services such that the output of a first service serves as input to a second service.

In a further embodiment, no user intervention is required after the test object has been defined.

As discussed above, known methods for testing cloud-hosted applications involve manually invoking and monitoring individual services that may be employed by a cloud-hosted application. In an embodiment, the test object need not be transmitted to services individually and may be defined as input to a first service of one or more services that are accessed and employed by the cloud-hosted application. The first service may subsequently transmit data, in the form of an output of the first service, to a second service for further processing. This process may be repeated multiple times before an output or outcome is returned to the test agent. Defining a test object such that the use of services for processing may be chained together improves the efficiency of validating a cloud-hosted application relative to known methods in which, as discussed above, services are invoked individually and manually. Accordingly, no user intervention is required for validating the cloud-hosted application after initiating a test.

In a further embodiment, the API interface is local to the cloud-hosted application.

In a further embodiment, the API formatted response and associated service log data collectively define an overall response to the test object.

In a further embodiment, processing the test object at the at least one service of the cloud-hosted application to generate an API formatted response and associated service log data comprises chaining test stages such that the output of a first test stage is used to configure the input to a second test stage.

Normal engagement of a cloud-hosted application by a communicating end user device to access and employ a particular function of the cloud-hosted application may involve a series of interactions between the end user device and the cloud-hosted application. Accordingly, to a test a particular function of a cloud-hosted application, as intended by a given test object, a test agent may be required to communicate with the cloud-hosted application in test stages. An embodiment allows for chaining test stages such that the output of a first test stage is used to configure the input to a second test stage. This mechanism improves the efficiency of validating a cloud-hosted application relative to known methods which, as discussed above, invoke individual services manually and provide no mechanisms for end-to-end automation. Accordingly, no user intervention is required for validating the cloud-hosted application after initiating a test.

In a further embodiment, validating the cloud-hosted application based on the API formatted response and the associated service log data generates test outcome data in the form of a test report.

In a further embodiment, validating the cloud-hosted application based on the API formatted response and the associated service log data generates test outcome data in the form of an alert indicative of whether or not the cloud-hosted application is positively validated.

Upon completion of a test, test outcome data may be generated for subsequent analysis by a tester. The test outcome data may be presented in various forms and may have varying levels of detail according to its form. The test outcome data may provide insights to help the tester understand where a cloud-hosted application may have failed. This allows for debugging the cloud-hosted application.

In a further embodiment, the test object comprises both an API request configured to be transmitted to the at least one service of the cloud-hosted application via an API interface and a service call configured to invoke the at least one service directly.

For a given API request, a corresponding service call may be defined. So as to ensure that a given API request is appropriately formatted for correct processing by the cloud-hosted application, and that the cloud-hosted application appropriately processes the given API request, the test object may comprise both an API request configured to be transmitted to the at least one service of the cloud-hosted application via an API interface and a service call configured to invoke the at least one service directly. This allows for the subsequent comparison of the resulting response data between each of the forms of the test object, which allows for determining whether the form of the API request, or the manner in which the API is request is processed at the cloud-hosted application, is in line with what is expected for the given input data, i.e., the test object.

In a further embodiment, validating the cloud-hosted application based on the API formatted response and the associated service log data is performed on the basis of a plurality of test objects.

A plurality of test objects may be transmitted to the cloud-hosted application, either in series or parallel, to test the cloud-hosted application. Validation of the cloud-hosted application may subsequently be performed on the basis of the plurality of test objects. A validation performed on the basis of a plurality of test objects may provide a more accurate validation determination since incidentally-correct responses (i.e. false positives) may be identified and considered when making a validation determination.

In a further embodiment, the test agent comprises a user interface for a tester to define the test object.

In a further embodiment, wherein validating the cloud-hosted application based on the API formatted response and the associated service log data comprises checking whether the schema of the API formatted response is consistent with expected schema results for the given test object.

BRIEF DESCRIPTION OF THE DRAWINGS

Embodiments of the invention will now be described, by way of example only, with reference to the accompanying drawings, in which.

DETAILED DESCRIPTION

In the description and figures that follow, certain exemplary embodiments of the invention are described.

The present disclosure is directed to systems and methods for end-to-end testing and validation of the operation of a cloud-hosted application. In this context, the term "end-to-end" characterises systems and methods which require no or limited user (i.e. tester) intervention in order to test and/or validate all or part of a cloud-hosted application after initiating the systems and methods for testing, i.e. after defining and transmitting a test object for processing by the cloud-hosted application.

Figure 1:
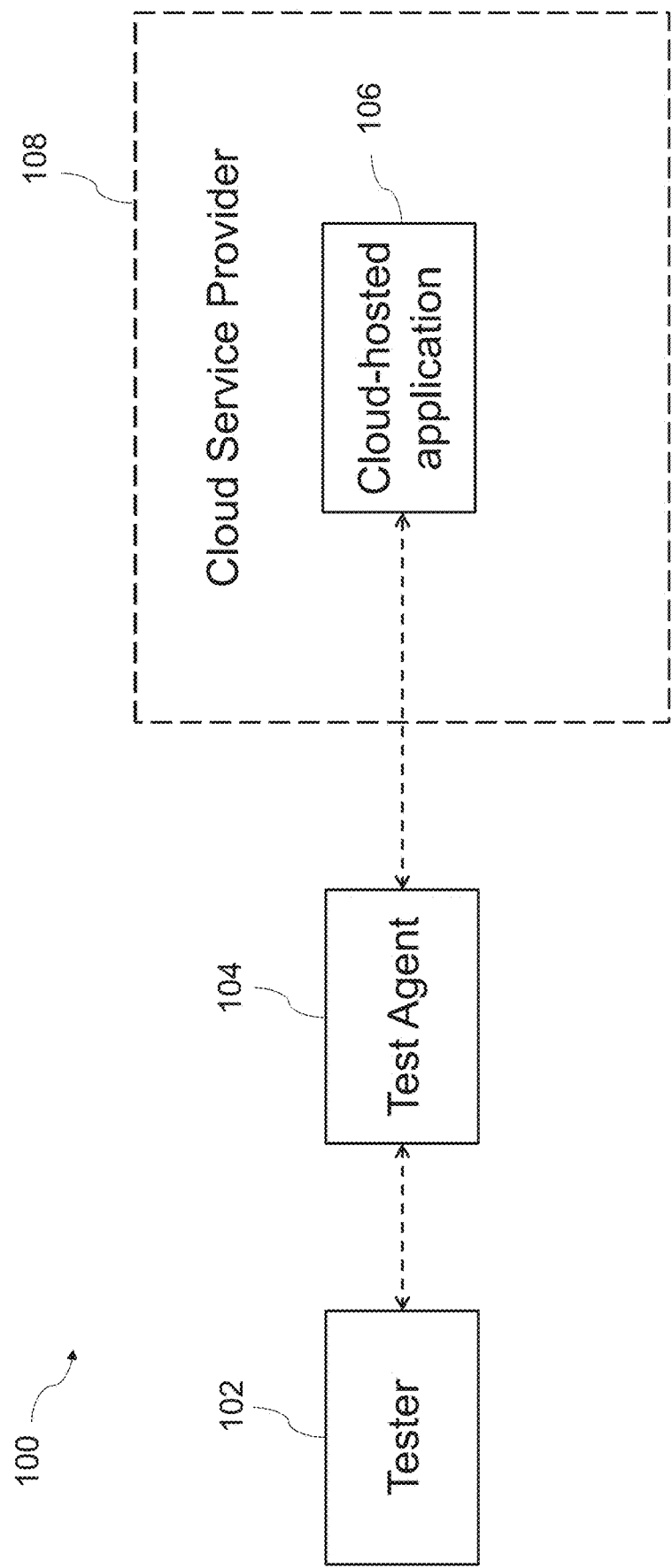
FIG. 1 schematically illustrates a system which tests a cloud-hosted application according to an embodiment of the invention.

Referring to FIG. 1, a system 100 for testing a cloud-hosted application 106 is shown. The system comprises a tester 102, a test agent 104 and a cloud-hosted application 106 provisioned on a cloud computing environment provided by a cloud service provider 108. The tester 102 may be any suitable user operator interacting with the test agent 104 to employ the system 100 to perform the methods disclosed herein.

The test agent 104 provides an interface between the tester 102 and the cloud-hosted application 106. The tester 102 and the cloud-hosted application 106 may belong to a first party that has developed the cloud-hosted application 106. Although the first party may own and have developed the cloud-hosted application 106, the cloud-hosted application 106 may be hosted on a service provided by a third-party, e.g. a cloud service provider 108. As is explained in further detail below, the test agent 104 is responsible for performing various steps of the methods disclosed herein. The test agent 104 may be any suitable end user device that can communicate (e.g. via a communication network), directly or indirectly, with the cloud-hosted application 106. The test agent 104 may be any suitable type of personal computing device, such as a laptop computer, a desktop computer, mobile phone, a web-enabled telephone, such as a smartphone, or a tablet device. The test agent 104 may comprise a suitable user application installed thereon for the tester 102 to access and employ the various functions of the test agent 104. The test agent 104 may be one or more devices local to the tester 102 or may exist remotely, on one or more servers that are not local to, but may be accessed by, the tester 102.

As mentioned above, the cloud-hosted application 106 may be an application developed by a first party but hosted on a cloud service provided by a third-party service provider 108. The cloud-hosted application 106 may comprise an application in its entirety or may comprise one or more sub-applications of a wider application that is hosted on one or more servers. The cloud-hosted application 106 may be accessed and employed by suitable end user devices that are configured to communicate with the cloud-hosted application 106 (e.g. via a suitable communication network). Suitable end user devices may be able to transmit data to, and receive data from, the cloud-hosted application 106 to access and employ the various functions provided by the cloud-hosted application 106. For testing and validation purposes, the cloud-hosted application 106 may communicate with the test agent 104 (e.g. via a suitable communication network) to test one or more of the functions of the cloud-application 106.

The cloud service provider 108 may include such service providers as "Amazon Web Services", "Microsoft Azure", "Google Cloud" and so on. Cloud computing, also known as utility computing, allows organisations and individuals to access and employ greater computing resource than may be possible locally. In hosting the cloud-hosted application 106, the cloud service provider 108 may provide the cloud-hosted application 106 with access to computing resources such as databases, mass storage, high-speed processing and other such services and functions. As is discussed in further detail below, organisations and individuals that subscribe to cloud services provided by cloud service providers and subsequently host their applications on cloud computing environments provided by the cloud service providers may be able to access and exercise their applications using a number of suitable means. In the description that follows, general terminology may be employed to refer to tools, features and mechanisms that are common to the various cloud services provided by suitable cloud service providers.

Figure 2:
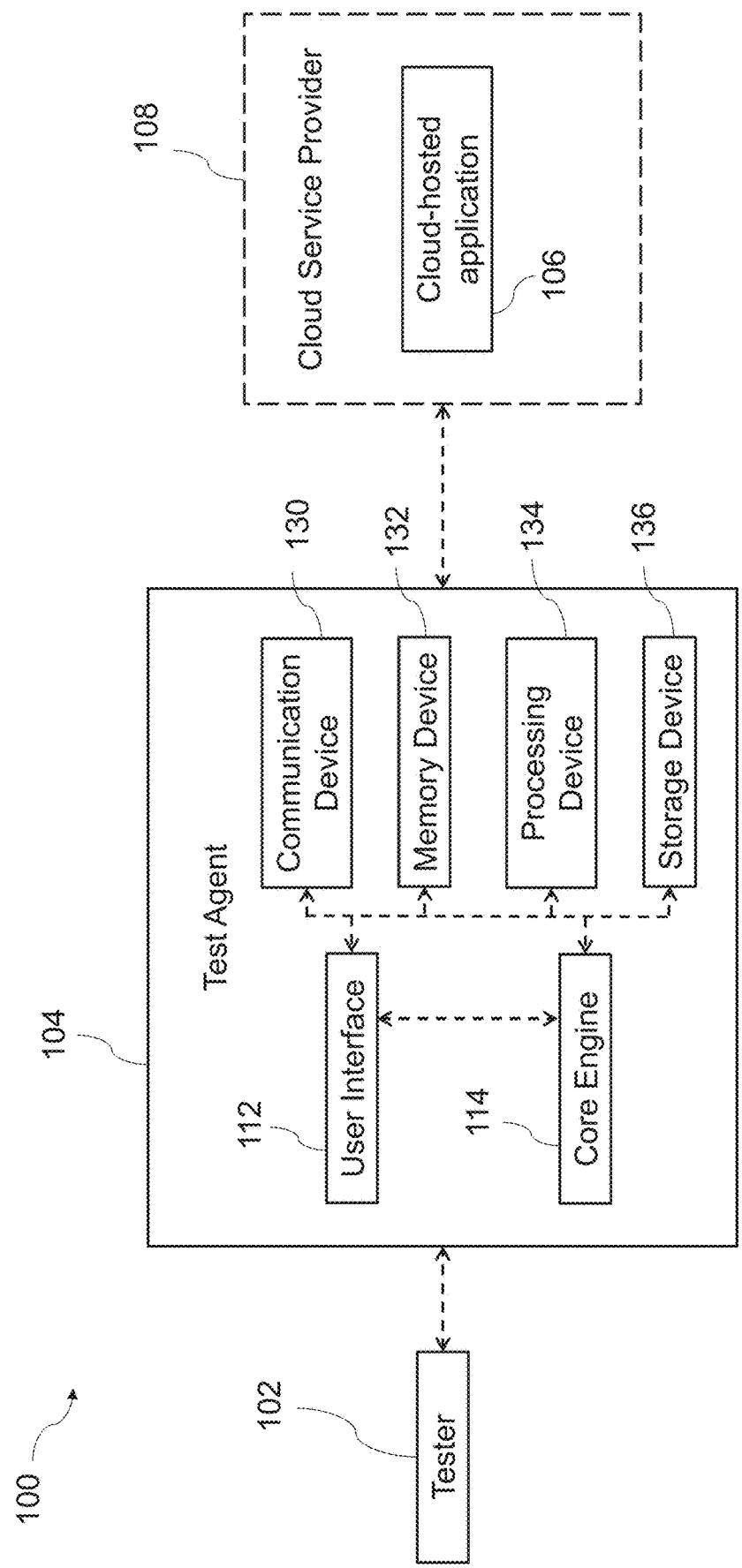
FIG. 2 schematically illustrates a more detailed view of a test agent according to an embodiment of the invention.

Referring to FIG. 2, a more detailed view of a test agent 104, in the context of system 100, is shown. The test agent 104 may comprise a user interface 112 and a core engine 114 that may be in communication with each other and/or one or more of a communication device 130, a memory device 132, a processing device 134 and a storage device 136.

Figure 5:
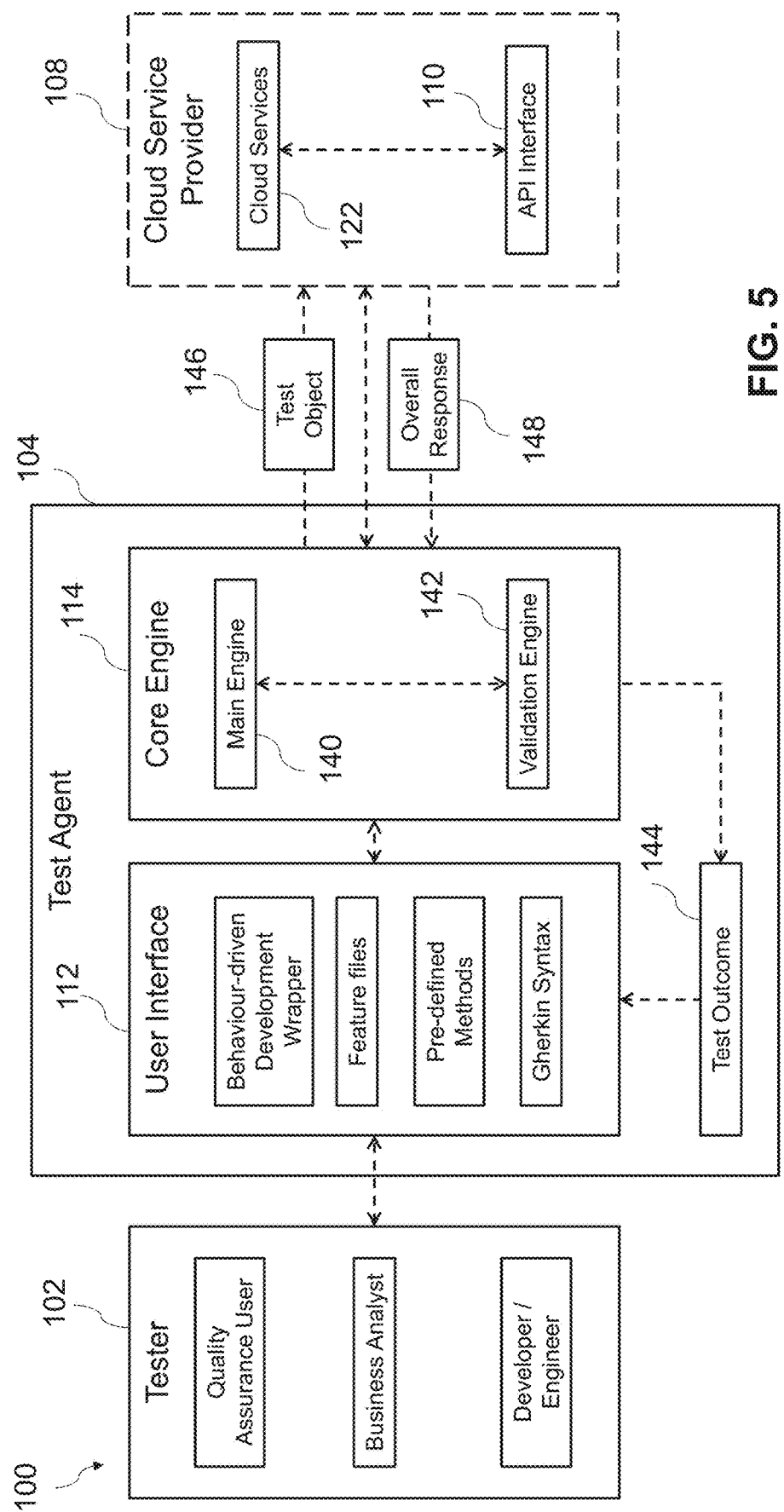
FIG. 5 schematically illustrates a more detailed view of a system which tests a cloud-hosted application according to an embodiment of the invention.

The user interface 112 may be any suitable user interface that allows the tester 102 to interact with test agent 104 in order to access and employ the various functions of the test agent 104. The user interface 112 may comprise peripheral devices, e.g., input and output devices such as a mouse, a keyboard and a display that allow the tester 102 to interact with the test agent 104. The user interface 112 may be a graphical user interface that provides the tester 102 with a visual representation of the various functions of the test agent 104. The user interface 112 may be a component of the test agent 104 as shown in FIG. 2. Alternatively, the user interface 112 may be external to, and in communication with, the test agent 104. As is explained in further detail below, with reference to FIG. 5, the user interface 112 may be designed to accommodate testers with varying degrees of technical knowledge.

The core engine 114 provides a central component of the system 100 and may interact, directly or indirectly, with all the other components of the system 100. As is further explained below, with reference to FIG. 5, the core engine 114 is responsible for managing the necessary data, in combination with one or more of the other components of the system 100, in order for the system 100 to test and validate the operation of the cloud-hosted application 106.

The communication device 130 may allow the test agent 104 to communicate with both the tester 102 and the cloud-hosted application 106 (e.g. via a suitable communication network and/or communication interface). The communication device 130 may include one or more wired or wireless transceivers to allow the test agent 104 to communicate with the tester 102 and the cloud-hosted application 106 (e.g., via WiFi, Bluetooth, and/or Ethernet communication devices). The communication device 130 may also enable communication of the test agent 104 with peripheral devices of the user interface 112 and the other components of the test agent 104. The communication device 130 may be configured to allow the test agent 104 to transmit data to, and receive data from, the cloud-hosted application 106 directly or via an intermediary, such as an API (application programming interface).

The memory device 132 may be any device that stores data, temporarily or otherwise, generated or received by the other components of the system 100. Memory device 132 may comprise one or more of random-access memory (RAM), read only memory (ROM), non-volatile random-access memory (NVRAM), flash memory, other volatile memory, and other non-volatile memory. The memory device 132 may hold data generated by the cloud-hosted application for subsequent use by the other components of the test agent 104.

The processing device 134 may include memory (e.g., read only memory (ROM) and random-access memory (RAM)) for storing processor-executable instructions and one or more processors that execute the processor-executable instructions. The processing device 134 may also communicate with storage device 136. The processing device 134 may include two or more processors and the processors may operate in a parallel or distributed manner. The processing device 134 may execute an operating system or other software associated with the test agent 104.

The storage device 136 may be any form of non-volatile data storage device such as one or more of a hard disk drive, a solid-state drive, a magnetic disc, an optical disc, a ROM, etc. The storage device 136 may store an operating system for the processing device 134 to access and execute in order for the test agent 104 to function. The storage device 136 may also store one or more computer programs (or software or instructions or code). The storage device 136 may store data associated with tests that may be performed by the test agent 104.

Figure 3:
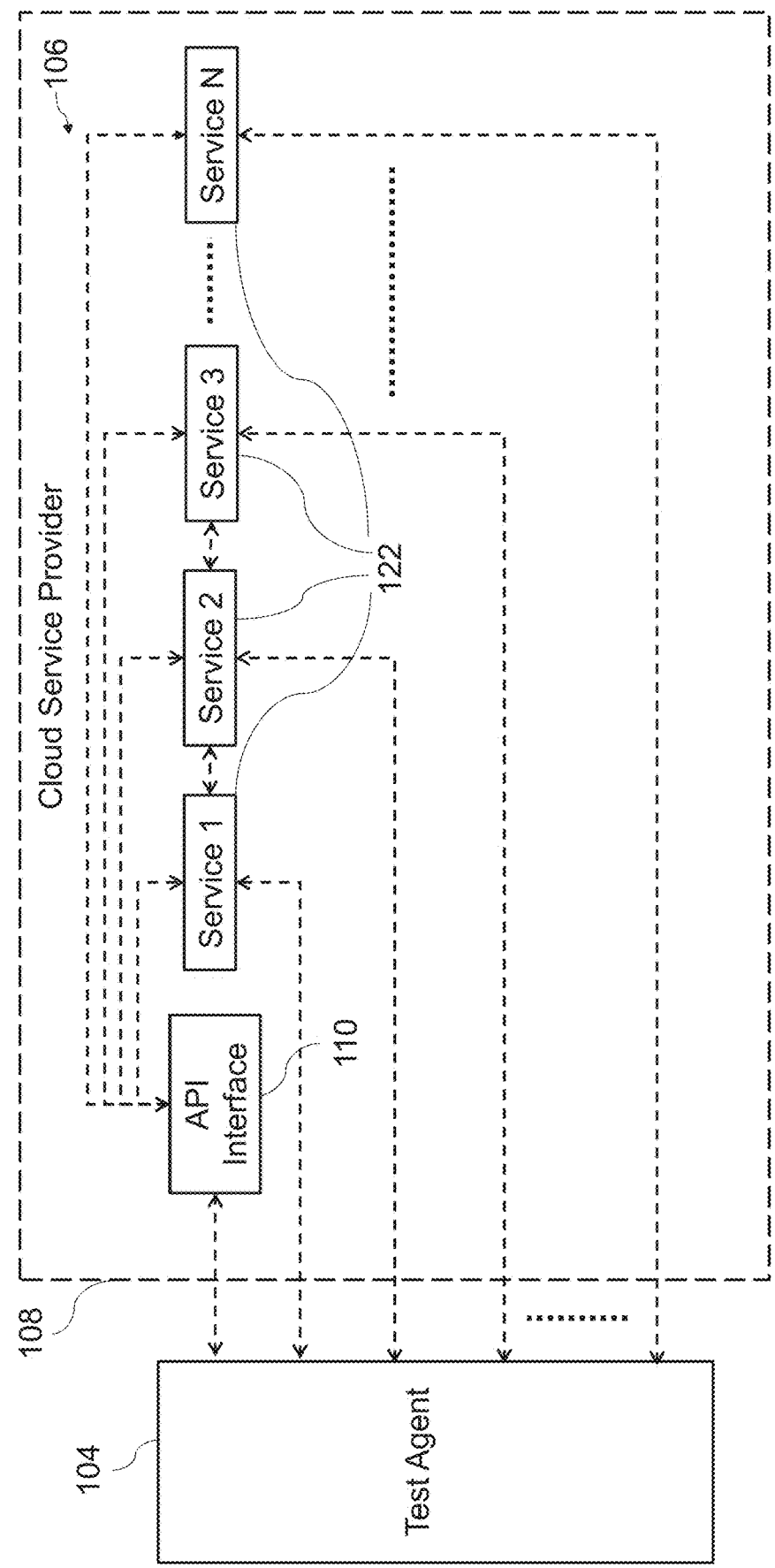
FIG. 3 schematically illustrates a more detailed view of a cloud-hosted application according to an embodiment of the invention.

Referring to FIG. 3, a more detailed view of a cloud-hosted application 106 is provided. The cloud-hosted application 106 may comprise one or more services 122 that are configured to perform various data management and data processing functions of the cloud-hosted application 106. The one or more services 122 may include standard services that may be provided by the cloud-service provider 108. The one or more services 122 may also include services that may be customised or modified by organisations and individuals to whom the cloud-hosted application 106 belongs. The one or more services 122 may be configured to interact with custom software, located locally to the cloud-hosted application 106 (i.e. at the cloud service provided by the cloud service provider 108), or on or more communicating non-local devices. The one or more services 122 may include object storage services, virtual computing services, computing-resource management services and other such data management and processing services. The one or more services 122 may receive data for processing and may transmit data between one another. The one or more services 122 may receive data from, and transmit data to, the test agent 104 directly. Alternatively, the one or more services 122 may receive data from, and transmit data to, API interface 110. APIs provide software intermediaries that allow applications to communicate with one another. As is explained in further detail below, the API interface 110 may serve as one possible communication interface between the test agent 104 and the cloud-hosted application 106. The API interface 110, like the cloud-hosted application 106, may exist as part of the service provided by the cloud service provider 108.

The API interface 110 may interface with the endpoints of the one or more services 122 of the cloud-hosted application 106. The API interface 110 may also include an API gateway that is configured to provide a communication interface between the test agent 104 and the endpoints of the one or more services 122 of the cloud-hosted application 106. Alternatively, the API gateway may be located external to the API interface 110 and may be located on the same server or a different server to the API interface 110. Where the API gateway may be located external to the API interface 110, there may be a communication channel between the API gateway and the API interface 110. The API interface 110 may be configured to receive API requests from end user devices that intend to communicate with the cloud-hosted application 106. In the present context, during cloud-hosted application testing and validation, the API interface 110 may be configured to receive API requests from the test agent 104. An API request received by the API interface 110 from a communicating end user device, e.g., test agent 104, is translated into one or more inputs to the one or more services 122 of the cloud-hosted application 106 for subsequent processing by the one or more services 122. After processing the one or more inputs to the one or more services at the one or more services 122, an API formatted response may be generated by the one or more services 122 and transmitted to the API interface 110 for subsequent transmission to the communicating end user device, i.e., in the present context, the test agent 104.

Additionally, the one or more services 122 of the cloud-hosted application 106 may be exercised directly via direct service calls from the test agent 104. The test agent 104 may transmit one or more service calls configured to invoke the one or more services 122 of the cloud-hosted application 106, directly.

Figure 4:
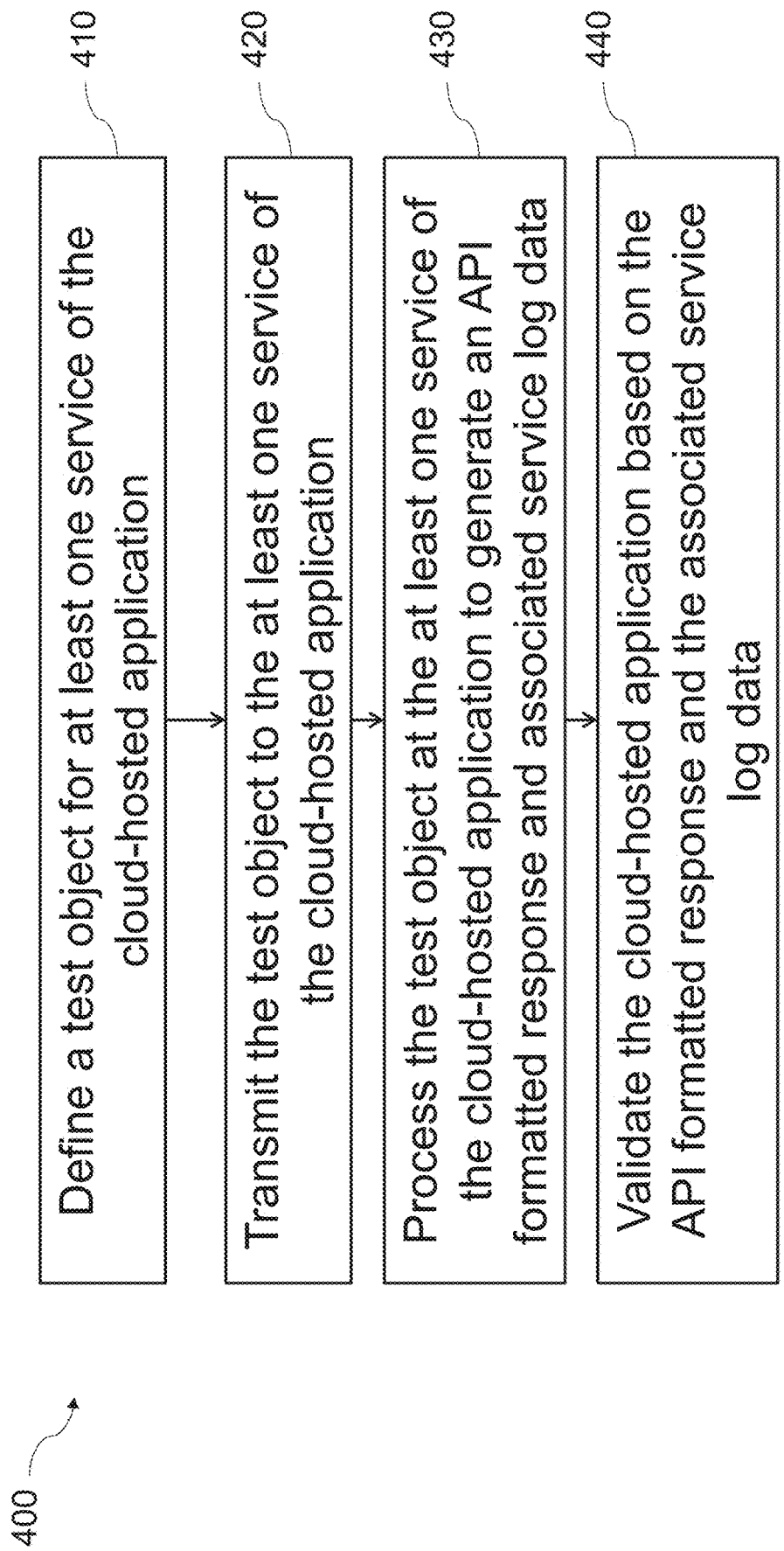
FIG. 4 is a flow diagram of a method for testing a cloud-hosted application according to an embodiment of the invention.

Referring to FIG. 4, a flow diagram of a method 400 for testing a cloud-hosted application 106 is shown. The method 400 may be performed by a test agent 104 being operated by a tester 102. The method 400 of FIG. 4 will be described below, with further reference to FIG. 5, which provides a more detailed view of system 100.

In step 410, the tester 102 may define a test object 146 at the test agent 104. The tester 102 may interact with the user interface 112 of the test agent 104 to define the test object 146. The tester 102 may be one or more of a quality assurance user, a business analyst or a developer, or any other suitable user. The user interface 112 may provide a "Gherkinian" user interface, i.e., a user interface that employs the ordinary language parser "Gherkin" and which enables "behaviour-driven development". This allows a tester 102 to create tests at the test agent 104 in plain English language, providing a user-friendly user interface 112 and making it easier for users with limited technical knowledge to engage with the test agent 104 and employ its various functions.

The test agent 104 may also be pre-programmed with known or expected tasks and functions, thus requiring a zero-development approach when a tester 102 initiates a test of the cloud-hosted application 106 according to one or more of the pre-programmed tasks and functions. This makes repeated testing more efficient.

The test object 146 serves to emulate data that may be transmitted by a suitable end user device that may communicate with the cloud-hosted application 106 during normal engagement with the cloud-hosted application 106. The test object 146 is defined by a combination of user (i.e. tester 102) inputs and pre-defined functions and variables that may be accessed from one or more of the components of the test agent 104, e.g., the storage device 136. When defining the test object 146, the tester 102 may define one or more of an interaction mechanism (i.e., whether the test object 146 has the form of a direct service call or an API request), a base URL to access a particular cloud-hosted application, path details which define particular service endpoints, query parameters details which define which operations belonging to the particular services being tested are to be queried, a payload comprising the test data to be processed at the one or more services 122, a header for authenticating the test object 146 and the API service operation details (e.g. "GET" (retrieve data from the cloud-hosted application 106), "PUT" (updates data that is stored in the cloud-hosted application 106), "POST" (sends data to the cloud-hosted application 106 for processing)). Following tester 102 input to define the test object 146, the main engine 140 (see FIG. 5) subsequently compiles a suitable test object 146 according to the user inputs provided by the tester 102 at the test agent 104.

The test object 146 may be defined to test one or more services 122 of the cloud-hosted application 106. For example, the test object 146 may be defined to test every service of the cloud service provider 108 that is accessed and employed by the cloud-hosted application 106. Alternatively, the test object 146 may be defined to test a specific function of the broader cloud-hosted application 106, in which case the test object 146 may be defined to test only a portion of the services 122 of the cloud service provider 108 that may be accessed and employed by the cloud-hosted application 106.

As explained above, the test agent 104 may communicate with the cloud-hosted application 106 directly (i.e. via direct service calls) or via an API interface 110. Accordingly, the test object 146 may be defined as a direct service call configured to be transmitted directly to the cloud-hosted application to invoke the one or more services 122 of the cloud-hosted application 106 or an API request configured to be transmitted to one or more services 122 of the cloud-hosted application 106 via the API interface 110.

Alternatively, the test object 146 that is defined at the test agent 104 may include both an API request configured to be transmitted to the one or more services 122 of the cloud-hosted application 106 via an API interface 110 and a service call configured to invoke the one or more services 122 directly. The two forms of the test object 146 may be transmitted in parallel or in series. Accordingly, for a given test object 146, one or both of a direct service call configured to be transmitted directly to the cloud-hosted application to invoke the one or more services 122 of the cloud-hosted application 106 and an API request configured to be transmitted to one or more services 122 of the cloud-hosted application 106 via the API interface 110 may be compiled for subsequent transmission. Therefore, for each direct service call that may be compiled, there exists a corresponding API request that may be compiled, and vice versa, each capable of exercising and testing the cloud-hosted application 106 in the same manner. However, while corresponding direct service calls and API requests may produce the same outcome in respect of exercising the cloud-hosted application 106, corresponding service calls and API requests do not have the same technical form.

In step 420, the test object 146 that is defined at the test agent 104 may subsequently be transmitted to the one or more services 122 of the cloud-hosted application 106. If the test object 146 is defined as a direct service call, the test object 146 may be transmitted from the test agent 104 to the one or more services 122 of the cloud-hosted application 106, directly (e.g., via a suitable communication network and authentication and connection interface). If the test object 146 is defined as an API request, the test object 146 may be transmitted from the test agent 104 to the API interface 110. The test object 146 may be transmitted from the test agent 104 using communication device 114 and may be transmitted to the cloud-hosted application 106 hosted on the cloud service provided by cloud service provider 108 via a suitable communication network.

Depending on the how the test object 146 is defined by the tester 102, and subsequently compiled by the main engine 140, the main engine 140 will identify a suitable communication methodology, e.g., a particular library package that defines a communication method for a direct service call, or an API request package that defines a communication method for transmitting the test object 146 to the cloud-hosted application 106 via API interface 110. Once a suitable communication methodology has been identified, the main engine 140 will authenticate the tester 102 with the cloud service provider 108, establish a connection between the test agent 104 and the cloud service provider 108 (and therefore the cloud-hosted application 106) and subsequently transmit the test object 146 to one or more services 122 of the cloud-hosted application 106, either as an API request via the API interface 110 or as a direct service call.

In the event that the test object 146 is defined as an API request configured to be transmitted to the one or more services 122 of the cloud-hosted application 106 via API interface 110, the main engine 140 will transmit an API request to execute an end-to-end exercise of "invisible" services 122 in the back end of the cloud service provider 108. The API request package identified by the main engine 140 will establish a connection with the cloud service provider 108 and will transmit requests to the API endpoints of the one or more services 122 of the cloud-hosted application 106 during testing.

In the event that the test object 146 is defined as a direct service call, the main engine 140 will transmit data to exercise the one or more services 122 of the cloud-hosted application 106 through explicit service calls using the library package identified by the main engine 140.

In step 430, the test object 146 is processed at the one or more services 122 of the cloud-hosted application 106. The test object 146 will define operations to be exercised at the one or more services 122 of the cloud-hosted application 106. Each of the one or more services 122 of the cloud-hosted application 106 is configured to receive inputs at its endpoints, generate service log data and transmit outputs from its endpoints to other services 122 of the cloud-hosted application 106 or to the API interface 110, either as subsequent actions or as generated outcomes. As is explained in further detail below, with reference to FIG. 6, the test agent 104 allows for automatically chaining the stages of a test so as to provide end-to-end testing of all or part of the cloud-hosted application 106 until the processing of the test object 146 is terminated by the cloud-hosted application 106. Data generated by the one or more services 122 of the cloud-hosted application 106 may be stored locally on the cloud service provided by the cloud service provider 108 and may be subsequently transmitted to and/or accessed by the test agent 104.

Termination of the processing of the test object 146 may be indicated by a return event transmitted from the cloud-hosted application 106 to the test agent 104. The data produced by the one or more services 122 of the cloud-hosted application 106 during processing of the test object 146 may subsequently be retrieved. Alternatively, the data produced by the one or more services 122 of the cloud-hosted application 106 during processing of the test object 146 may be pulled by the test agent 104 from the cloud-hosted application 106 during the processing of the test object 146 at the one or more services 122 of the cloud-hosted application 106. Upon completion of the processing of the test object 146 at the at the one or more services 122 of the cloud-hosted application 106, an API formatted response may be generated. This API formatted response may be transmitted from an endpoint of the one or more services 122 of the cloud-hosted application to the API interface 110. The processing of the test object 146 at the at least one service 122 of the cloud-hosted application 106 may also generate service log data for each of the one or more services 122 of the cloud-hosted application 106. The API formatted response may consist of one or more of a response code, end response data, schema data, mandatory and non-mandatory fields, URLs and response headers. The service log data may consist of one or more individual service logs including session IDs, data for other requests performed by other direct service calls or API requests, service failure logs and fetch-any-file formatted data (e.g., JSON, IMG).

As part of the test execution process, a validation engine 142, that may exist as part of the core engine 114, may raise a pull request to fetch the API formatted response and the associated service log data from the data generated by the cloud-hosted application 106 and stored on the cloud service provided by the cloud service provider 108. The data generated by the cloud-hosted application 106 and stored on the cloud service provided by the cloud service provider 108 may be fetched in any suitable fetch-any-file format, e.g., the JSON format, as an "overall response" 148 object.

In step 440, validation of the cloud-hosted application 106 may be performed based on the API formatted response and the associated service log data, i.e., based on the "overall response" 148 to the test object 146. Upon receiving the data in the form of an "overall response" 148, the validation engine 142 may scan the data and may fragment the data into smaller units of data, each of which may be individually validated at the test agent 104.

The validation engine 142 may subsequently perform various tests to validate all or part of the cloud-hosted application 106 according to the given test object 146. These tests involve performing various checks on the fragmented data derived from the "overall response" 148. The tests may be performed serially or may be performed in parallel. The tests that succeed are marked as passes, while the remaining tests are marked as fails. All or part of the cloud-hosted application 106 may be deemed positively validated for a given test object 146 if the validation engine 142 passes all tests associated with the given test object 146. Alternatively, all or part of the cloud-hosted application 106 may be deemed positively validated for a given test object 146 if the validation engine 142 passes above a threshold level of tests associated with the given test object 146. Accordingly, validation of all or part of the cloud-hosted application 106 may be based on both the API formatted response and the associated service log data, i.e. the "overall response" 148, for a given test object 146. For a given test object 146, the following tests may be performed via the validation engine 142:

Validation of API End Response

This test involves checking whether the API end response of an API formatted response to a given test object 146 is in line with the expected response for the given test object 146. The API end response provides an output of the processing of the test object 146 at the one or more services 122 of the cloud-hosted application 106. For example, if a HTTP response "200" is expected in response to a given test object 146 and is subsequently received at the validation engine 142, then this test is passed. An API formatted response may include one or more end responses associated with one or more services 122 of the cloud-hosted application. Accordingly, this test may involve checking whether each end response of the API formatted response to a given test object 146 is in line with the expected end responses for the given test object 146. The test may be passed if every sub-test (i.e. a check for every end response in the case of multiple end responses) is passed. Alternatively, the test may be passed if the number of sub-tests passed is above a particular threshold.

Schema Validation of API Formatted Response

An API formatted response may also include schema data. The schema data of an API formatted response characterises the structure of the data that makes up the API formatted response. This test involves the validation engine 142 scanning the API formatted response and subsequently checking the schema of the response, which may include checking one or more of the number of fields, the type of data in each field and if the data of each field is mandatory or non-mandatory against what is expected for the given test object 146. For example, if the schema data of an API formatted response has three fields of data and this in line with the number of fields of data expected for a given test object 146, then a sub-test relating to the number of fields of data may be passed. For a complete validation of the schema data of an API formatted response, each sub-test (i.e. relating to each aspect of the schema data) may be performed. Accordingly, only when each sub-test of a schema validation of an API formatted response is passed may this test be passed. Alternatively, this test may be deemed passed if the number of sub-tests passed is above a particular threshold.

Service Log Data Validation Vis a Vis the API Formatted Response

This test involves comparing the fields of the service log data with the fields of the API formatted response for a given test object 146. An API formatted response is not limited to end response data but may also include additional fields of data related to, and supplementing, the end response data. This data may also be accessed directly from the service log data of the one or more services 122 of the cloud-hosted application 106. Accordingly, each of the fields of the API formatted response may be compared with each of the corresponding fields of the service log data for a given test object 146. For example, in the case that one of the fields of data of the API formatted response relates to "customer age", this field of data may be compared with a corresponding field of data in the service log data. If a match is found between all of the fields of data comparable between the API formatted response and the service log data, this test may be passed. Where there is more than one field of data that may be compared between the API formatted response and the service log data, individual sub-tests may be performed for each field of data. This test may be deemed passed if each sub-test passes. Alternatively, this test may be deemed passed if the number of sub-tests passed is above a particular threshold.

Validating the cloud-hosted application 106 based on the API formatted response and the associated service log data may additionally comprise one or more of the following:
1. Checking that data of the fields of the API formatted response and the associated service log data match;
2. Checking that the fields of data of the API formatted response are consistent with the fields of data of the associated service log data;
3. Comparing the data of the fields of the API formatted response with the data of the fields of data of the associated service log data;
4. Checking that the fields of data of the API formatted response are sufficiently similar to the fields of data of the associated service log data; and/or
5. Checking that one or more of the fields of data of the API formatted response matches one or more of the corresponding fields of data of the associated service log data.

Service Log Data Validation Vis a Vis the API Request (where the Test Object is an API Request)

Additionally, in the case of the test object 146 being an API request configured to be transmitted to the one or more services 122 via the API interface 110, service log data validation vis a vis the API request may be performed. This test involves comparing whether the service log data is in line with the service log data expected for the given API request (i.e. the test object 146). The service log data for the one or more services 122 of the cloud-hosted application 106 may include one or more fields of data related to the processing of a test object 146 at the one or more services 122. The service log data may also include output data of the one or more services 122 associated with processing the test object 146. Accordingly, for a given test object 146 in the form of an API request, the various fields of the service log data may be checked against the expected response for a given API request. Where there is more than one field of data belonging to the service log data, individual checks may be performed for each field of data. This test may be deemed passed if each field of data is in line with that which is expected. Alternatively, this test may be deemed passed if the number of fields that are in line with that which is expected is above a particular threshold.

The tests above merely provide examples of possible tests and validation mechanisms that may be performed. The validation engine 142 may be configured to perform other suitable tests on the basis of the test object 146, the API formatted response and the associated service log data.

Upon completing one or more of the above tests, a validation of all or part of the cloud-hosted application 106 may be performed on the basis of the test results for a given test object 146. If all of the tests performed for a given test object 146 have passed, the cloud-hosted application 106 may be deemed positively validated. Alternatively, if the number of tests passed for a given test object 146 is above a threshold, the cloud-hosted application 106 may also be deemed positively validated.

Validation of all or part of the cloud-hosted application 106 may also be performed on the basis of a plurality of test objects 146 that may be employed for testing and validation of the cloud-hosted application 106 in series or parallel. For example, all or part of the cloud-hosted application 106 may be deemed positively validated if all of the tests corresponding to each of the test objects 146 defined and subsequently used for testing and validation are passed. Alternatively, all or part of the cloud-hosted application 106 may be deemed positively validated if the number of tests passed, either per test object 146, or in total across all of the test objects 146, are above a threshold. The tester 102 may define the extent of the tests to be performed at the testing agent 104 when defining the one or more test objects 146 and subsequently initialising the one or more tests.

Upon completing the one or more tests, data providing test outcomes 144 (see FIG. 5) may be produced as output of the core engine 114 and may be accessible from the user interface 112 of the test agent 104. The test outcome data 144 may be presented to the tester 102 at the user interface 112 of the test agent 104 in the form of a test report. The test report may provide results of the tests performed and may confirm whether or not all or part of the cloud-hosted application is deemed positively validated for one or more test objects 146. The test outcome data may be viewable on a display provided by the user interface 112 of the test agent 104. Alternatively, the test outcome data 144 provided by the core engine 114 to the user interface 112 of the test agent 104 may be in the form of an alert configured to indicate whether or not all or part of the cloud-hosted application is deemed positively validated for one or more test objects 146.

Figure 6:
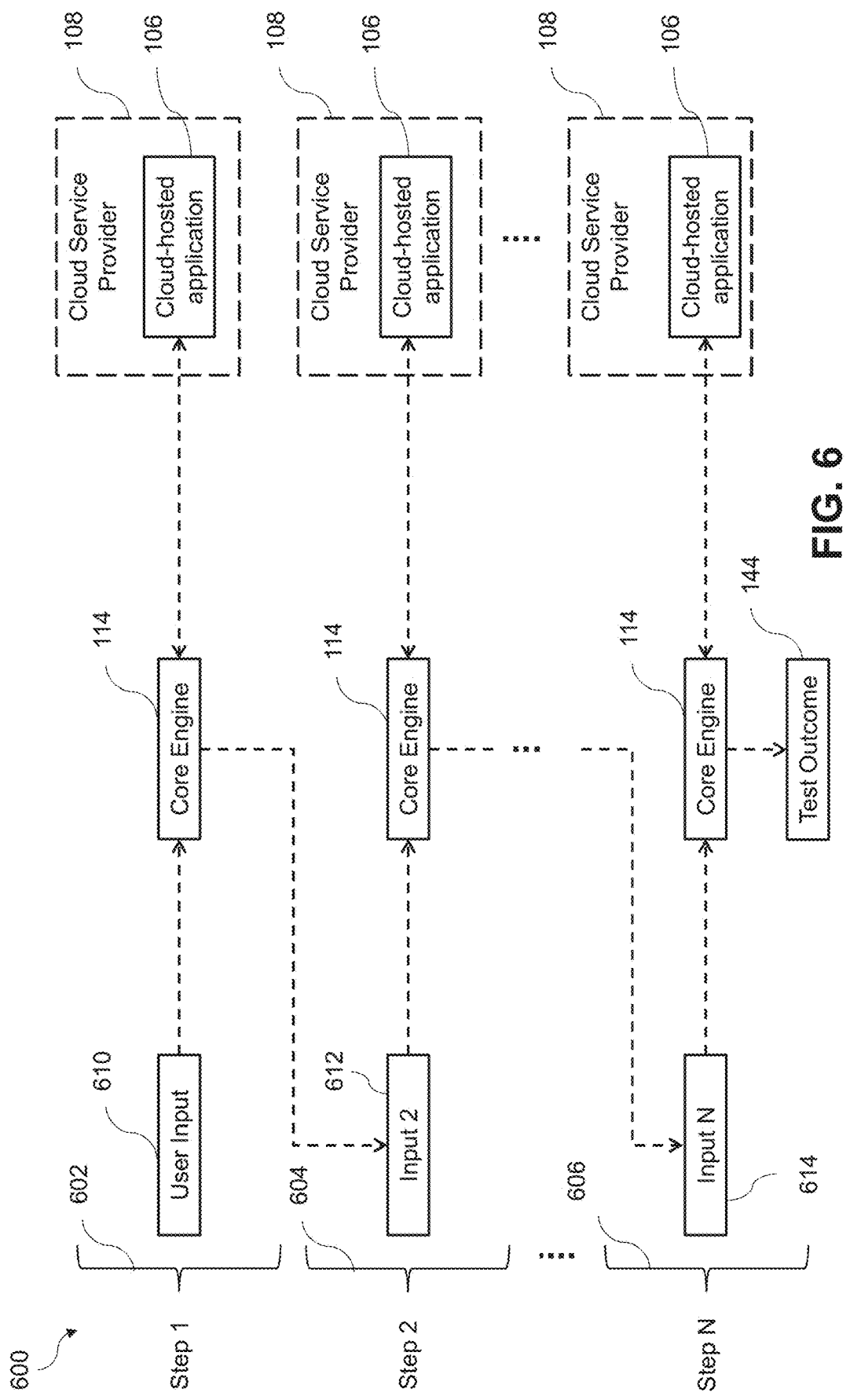
FIG. 6 schematically illustrates the chaining of test stages according to an embodiment of the invention.

Referring to FIG. 6, a schematic illustration of chaining test stages 600 is provided. The core engine 114 of the test agent 104 may be configured so as to enable the chaining of test operations (stages) for a given test object 146, where a response from a first operation (of a given test object 146) is used for intermediate validation and subsequent triggering of a second operation (for the given test object 146). This process may be repeated until the processing of the test object 146 at the one or more services 122 of the cloud-hosted application 106 is terminated. This approach helps to maximise the test coverage and improve back-end validations which otherwise requires the splitting of tests and manual validations.

In a first step 602, a tester 102 may provide user inputs 610 at the test agent 104. These user inputs 610 may include the definition of a test object 146 and the extent of the tests to be performed during validation of the test object 146. As described above, the core engine 114 subsequently compiles a test object 146 according to the user inputs 610 of the tester 102 at the test agent 104 before transmitting the test object 146 to the one or more services 122 of the cloud-hosted application 106 for subsequent processing. Upon processing the test object 146 at the one or more services 122 of the cloud-hosted application 106, a first response may be generated by the one or more services 122 of the cloud-hosted application 106 and subsequently transmitted back to the core engine 114 for validation purposes as described above.

When the first response is received at the core engine 114, the response may be scanned and the various attributes or fields of the response may be stored in, or may update, a global variable. Upon performing validation of the first response, a subsequent request in the form of the global variable may be triggered by validation of the first response and may subsequently be used as a second input 612 to the core engine 114 in a second step 604 of the chaining 600. Like in the first step 602, a request (this time the global variable) is transmitted to the one or more services 122 of the cloud-hosted for subsequent processing, intermediate validation and updating of the global variable.

This process may occur N number of times until a termination event is triggered by the cloud-hosted application 106, at which point data detailing the processing of each step of the chaining 600 may be generated by the core engine 114 as test outcome data 144 as described above. The chaining 600 may be performed for a test object 146 whether it be an API request configured to be transmitted to the at least one service 122 of the cloud-hosted application 106 via an API interface 110 or a direct service call configured to invoke the at least one service 122 of the cloud-hosted application 106 directly.

Figure 7:
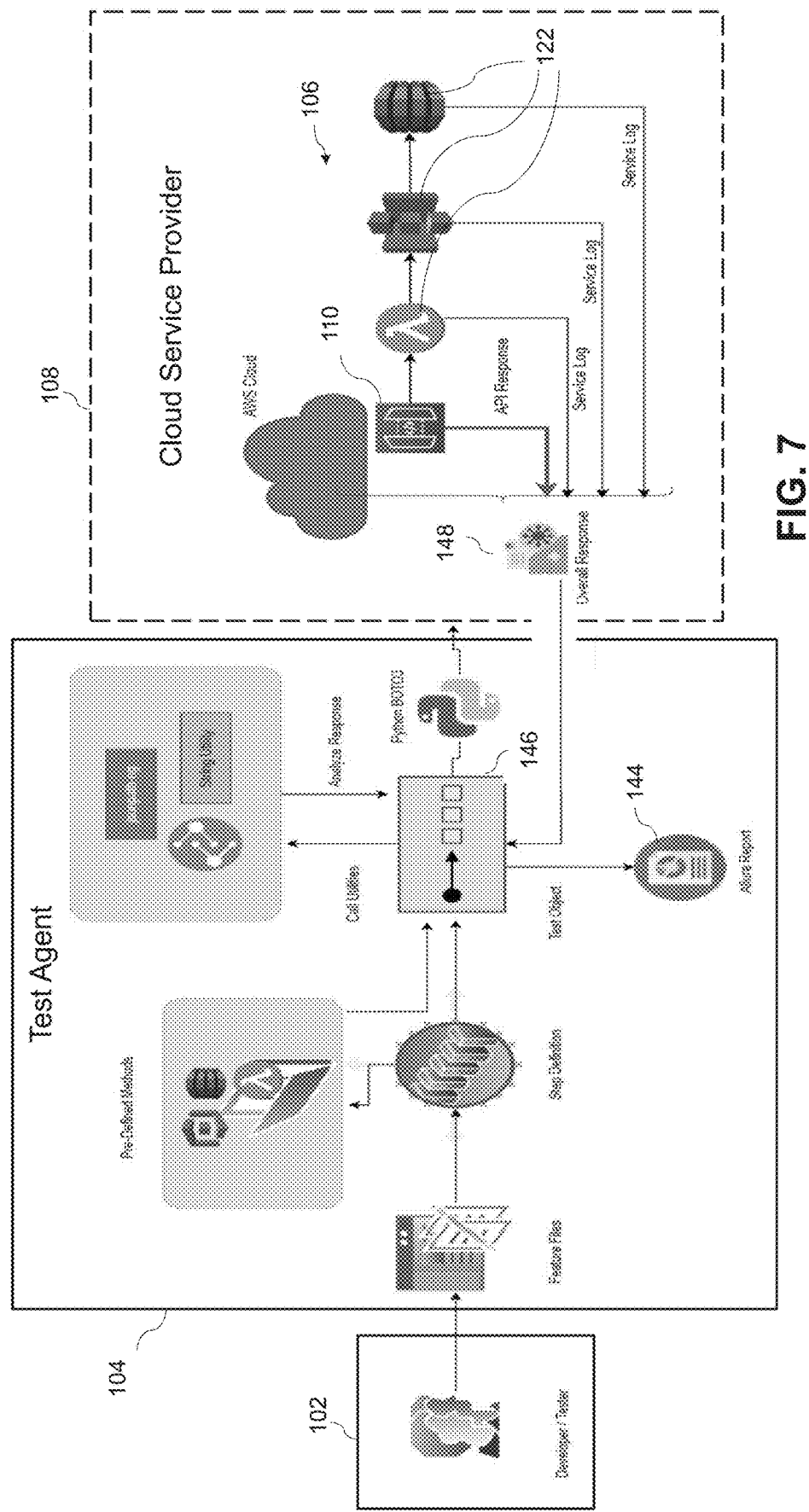
FIG. 7 schematically illustrates a stepwise architecture of a system which tests a cloud-hosted application according to an embodiment of the invention.

Referring to FIG. 7, a stepwise architecture of the system 100 which tests the cloud-hosted application 106 is provided. FIG. 7 refers to specific industry-recognised libraries, modules, file formats, utilities and services for defining and managing the data used by the system 100 for testing and validating the cloud-hosted application 106. For example, the third-party cloud service provider 108 may be "Amazon Web Services" and may include services 122 such as "AWS Lambda", "Amazon DynamoDB" and so on. The test agent 104 may also employ the use of "Python Boto 3" libraries to connect with "Amazon Web Services". A person skilled in the art will understand that the industry-recognised libraries, modules, file formats, utilities and services depicted in FIG. 7 merely serve as examples and may be substituted by suitable alternative libraries, modules, file formats, utilities and services.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc., and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the modules described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention Embodiments of the Invention 1. A computer-implemented method for end-to-end testing a cloud-hosted application, comprising:
   a. defining a test object for at least one service of the cloud-hosted application, the test object comprising an API request configured to be transmitted to the at least one service of the cloud-hosted application via an API interface or a service call configured to invoke the at least one service directly;
   b. transmitting the test object to the at least one service of the cloud-hosted application;
   c. processing the test object at the at least one service of the cloud-hosted application to generate an API formatted response and associated service log data; and
   d. validating the cloud-hosted application based on the API formatted response and the associated service log data.

2. An end-to-end cloud-hosted application test system, comprising:
   a test agent;
   an API interface; and
   a cloud-hosted application, comprising at least one service,
   wherein, the test agent is configured to:
      define a test object for at least one service of the cloud-hosted application, the test object comprising an API request configured to be transmitted to the at least one service of the cloud-hosted application via an API interface or a service call configured to invoke the at least one service directly;
      transmit the test object to the at least one service of the cloud-hosted application;
      receive an API formatted response and associated service log data in response to the at least one service of the cloud-hosted application processing the test object;
      validate the cloud-hosted application based on the API formatted response and the associated service log data.

3. The method of claim 1 or the system of embodiment 2, wherein validating the cloud-hosted application based on the API formatted response and the associated service log data comprises comparing the API formatted response and the associated service log data.

4. The method or the system of embodiment 3, wherein validating the cloud-hosted application based on the API formatted response and the associated service log data comprises comparing the data of the fields of the API formatted response with the data of the fields of service log data.

5. The method or system of any preceding embodiment, wherein validating the cloud-hosted application based on the API formatted response and the associated service log data comprises checking whether the API formatted response and the associated service log data are consistent with expected results for the given test object.

6. The method or system of any preceding embodiment, further comprising validating the cloud-hosted application based on comparing the API request with the associated service log data.

7. The method or system of any preceding embodiment, wherein the associated service log data characterises the processing at and the output of the at least one service when processing the test object at the at least one service.

8. The method or system of any preceding embodiment, wherein the API formatted response comprises API end response data.

9. The method or system of any preceding embodiment, wherein the API formatted response comprises schema data.

10. The method or system of any preceding embodiment, wherein transmitting the test object to the at least one service of the cloud-hosted application comprises transmitting the test object to a first of the at least one service.

11. The method or system of any preceding embodiment, wherein processing the test object at the at least one service of the cloud-hosted application to generate an API formatted response and associated service log data comprises chaining services such that the output of a first service serves as input to a second service.

12. The method or system of any preceding embodiment, wherein no user intervention is required after the test object has been defined.

13. The system or method of any preceding embodiment, wherein the API interface is local to the cloud-hosted application.

14. The system or method of any preceding embodiment, wherein the API formatted response and associated service log data collectively define an overall response to the test object.

15. The method or system of any preceding embodiment, wherein processing the test object at the at least one service of the cloud-hosted application to generate an API formatted response and associated service log data comprises chaining test stages such that the output of a first test stage is used to configure the input to a second test stage.

16. The method or system of any preceding embodiment, wherein validating the cloud-hosted application based on the API formatted response and the associated service log data generates test outcome data in the form of a test report.

17. The method or system of any preceding embodiment, wherein validating the cloud-hosted application based on the API formatted response and the associated service log data generates test outcome data in the form of an alert indicative of whether or not the cloud-hosted application is positively validated.

18. The method or system of any preceding embodiment, wherein the test object comprises both an API request configured to be transmitted to the at least one service of the cloud-hosted application via an API interface and a service call configured to invoke the at least one service directly.

19. The method or system of any preceding embodiment, wherein validating the cloud-hosted application based on the API formatted response and the associated service log data is performed on the basis of a plurality of test objects.

20. The system of embodiment 2, wherein the test agent comprises a user interface for a tester to define the test object.

21. The method or system of embodiment 9, wherein validating the cloud-hosted application based on the API formatted response and the associated service log data comprises checking whether the schema of the API formatted response is consistent with expected schema results for the given test object.

The invention claimed is:

1. A computer-implemented method for end-to-end testing a cloud-hosted application, comprising:
   a. defining a test object for at least one service of the cloud-hosted application, the test object comprising at least one of:

an API request configured to be transmitted to the at least one service of the cloud-hosted application via an API interface; and
a service call configured to be transmitted to the cloud-hosted application to directly invoke the at least one service of the cloud-hosted application;
b. transmitting the test object to the at least one service of the cloud-hosted application;
c. processing the test object at the at least one service of the cloud-hosted application;
d. receiving an API formatted response and associated service log data in response to the at least one service of the cloud-hosted application processing the test object;
e. validating an operation of the cloud-hosted application based on the API formatted response and the associated service log data, wherein validating the operation of the cloud-hosted application based on the API formatted response and the associated service log data comprises:
comparing the API formatted response and the associated service log data by determining whether data of fields of the API formatted response and data of fields of the associated service log data match; and
checking whether the API formatted response and the associated service log data are consistent with expected results for the test object; and
f. outputting, via a user interface, test outcome data based on the validating to indicate whether the cloud-hosted application is positively validated.

2. The method of claim 1, wherein validating the operation of the cloud-hosted application based on the API formatted response and the associated service log data further comprises comparing the data of the fields of the API formatted response with the data of the fields of the associated service log data.

3. The method of claim 1, further comprising validating the operation of the cloud-hosted application based on comparing the API request with the associated service log data.

4. The method of claim 1, wherein the associated service log data characterises the processing at and the output of the at least one service when processing the test object at the at least one service.

5. The method of claim 1, wherein the API formatted response comprises schema data.

6. The method of claim 5, wherein validating the operation of the cloud-hosted application based on the API formatted response and the associated service log data further comprises checking whether the schema data of the API formatted response is consistent with expected schema results for the test object.

7. The method of claim 1, wherein transmitting the test object to the at least one service of the cloud-hosted application comprises transmitting the test object to a first of the at least one service.

8. The method of claim 1, wherein processing the test object at the at least one service of the cloud-hosted application comprises chaining services such that the output of a first service serves as input to a second service.

9. The method of claim 1, wherein the API formatted response and associated service log data collectively define an overall response to the test object.

10. The method of claim 1, wherein processing the test object at the at least one service of the cloud-hosted application comprises chaining test stages such that the output of a first test stage is used to configure the input to a second test stage.

11. The method of claim 1, wherein the test object comprises an API request configured to be transmitted to the at least one service of the cloud-hosted application via an API interface.

12. The method of claim 1, wherein validating the operation of the cloud-hosted application based on the API formatted response and the associated service log data is performed on the basis of a plurality of test objects.

13. The method of claim 1, wherein the test object comprises a service call configured to be transmitted to the cloud-hosted application to directly invoke the at least one service of the cloud-hosted application.

14. The method of claim 1, wherein the test object comprises both an API request configured to be transmitted to the at least one service of the cloud-hosted application via an API interface and a service call configured to be transmitted to the cloud-hosted application to directly invoke the at least one service of the cloud-hosted application.

15. An end-to-end cloud-hosted application test system, comprising:
a test agent comprising a user interface;
an API interface; and
a cloud-hosted application, comprising at least one service,
wherein, the test agent is configured to:
define a test object for at least one service of the cloud-hosted application, the test object comprising:
an API request configured to be transmitted to the at least one service of the cloud-hosted application via an API interface; or
a service call configured to be transmitted to the cloud-hosted application to directly invoke the at least one service of the cloud-hosted application;
transmit the test object to the at least one service of the cloud-hosted application;
process the test object at the at least one service of the cloud-hosted application;
receive an API formatted response and associated service log data in response to the at least one service of the cloud-hosted application processing the test object;
validate an operation of the cloud-hosted application based on the API formatted response and the associated service log data, wherein validating the operation of the cloud-hosted application based on the API formatted response and the associated service log data comprises:
comparing the API formatted response and the associated service log data by determining whether data of fields of the API formatted response and data of fields of the associated service log data match; and
checking whether the API formatted response and the associated service log data are consistent with expected results for the test object; and
output, via the user interface, test outcome data based on the validating to indicate whether the cloud-hosted application is positively validated.

16. The system of claim 15, wherein validating the operation of the cloud-hosted application based on the API formatted response and the associated service log data further comprises comparing the data of the fields of the API formatted response with the data of the fields of the associated service log data.

17. The system of claim 15, further comprising validating the operation of the cloud-hosted application based on comparing the API request with the associated service log data.

18. The system of claim 15, wherein the associated service log data characterises the processing at and the output of the at least one service when processing the test object at the at least one service.

* * * * *